April 5, 1960  R. LARSON  2,931,881
SOLDERING DEVICE
Filed March 27, 1957
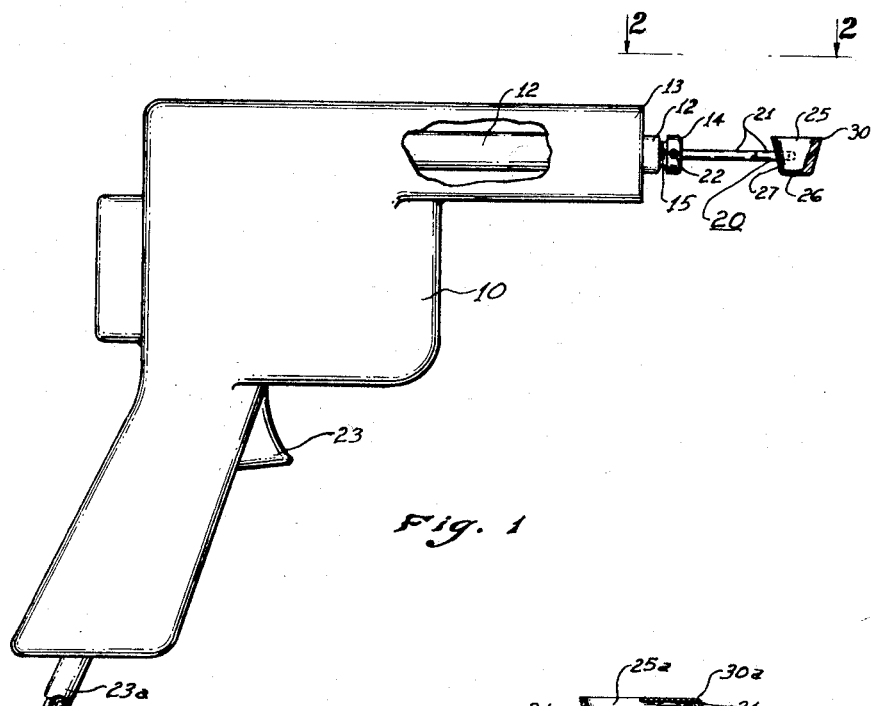
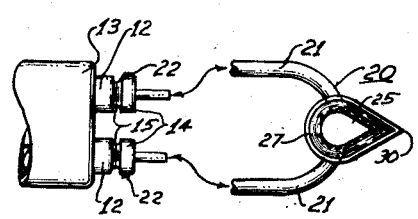
Fig. 2
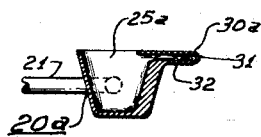
Fig. 3
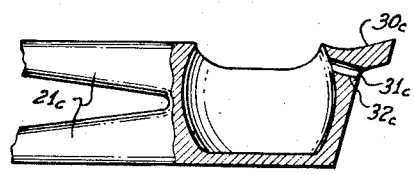
Fig. 5
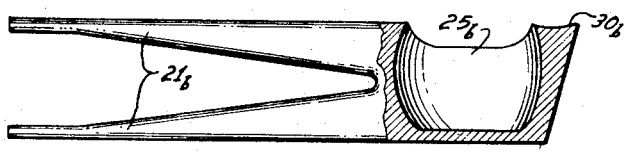
Fig. 4
INVENTOR.
Roland Larson
BY Mark E. Shirk
Attorney

United States Patent Office 2,931,881
Patented Apr. 5, 1960

2,931,881

SOLDERING DEVICE

Roland Larson, Tucson, Ariz., assignor of forty-nine percent to Willis R. Dees, Tucson, Ariz.

Application March 27, 1957, Serial No. 648,908

7 Claims. (Cl. 219—28)

This invention relates to electrically heated apparatus and more particularly to electrically heated soldering apparatus for intermittent use.

An object of the invention is to provide an improved quick-heating electrical heating device.

Another object of the invention is to provide an improved heating tip for a quick-heating electrical soldering device.

Another object of the invention is to provide a quick-heating electrical soldering iron wherein the heating tip incorporates a pot therein which may be used for melting solder, and for administering the same to the materials being worked.

A further object of the invention is to provide a quick-heating electrical soldering iron having a self-feeding heating tip.

Other objects will become apparent as the invention is more fully set forth.

Quick heating soldering irons of the pistol-grip type are well known from Patents Nos. Re. 23,619 and 2,680,187. This type of soldering iron is especially useful for small electronic work requiring the concentration of soldering heat in small, relatively inaccessible places. When larger work requires soldering, it is customary to use soldering irons which heat more slowly, but have much larger working surfaces. Both types of soldering irons are very efficient for their intended uses.

My invention, on the other hand, is primarily designed for, although not limited to, work in a border sphere wherein the ordinary quick-heating soldering iron has a working surface which is too small and the regular soldering iron is too slow and cumbersome. The work especially suited for one embodiment of my improved quick-heating soldering device consists primarily of soldering electrical wiring and other articles which may be "dip soldered" and which are of a size requiring heat over a larger area than can be efficiently covered with known types of quick-heating soldering irons. This embodiment of the invention incorporates a solder-melting pot into the secondary winding of a quick-heating soldering iron.

Another embodiment of the invention combines a pot, self-feeding channel and a working end into the secondary winding of a quick-heating soldering iron and is useful in smaller work, such as electronic work, in inaccessible places because the working tip is small.

The invention will be readily understood by referring to the following detailed specification including the several drawings forming a part thereof, wherein:

Fig. 1 is an elevational view, partly in section, of a quick-heating electrical soldering gun showing one embodiment of the invention;

Fig. 2 is a plan view taken along line 2—2 of Fig. 1 showing the heating tip on an enlarged scale;

Fig. 3 is an elevational view, partly in section, of another embodiment of the invention;

Fig. 4 is an elevational view, partly in section, of a modified form of the device shown in Fig. 2; and Fig. 5 is an elevational view, partly in section, of a modified form of the device shown in Fig. 3.

Referring to Fig. 1 of the drawings, the numeral 10 designates a conventional soldering gun which is well known in the art and may be of the type disclosed in Patent No. Re. 23,619 which includes a stepdown transformer having primary turns, not shown, and secondary turns 12.

The secondary turns 12 terminate at the end 13 of the gun 10. A socket 14 is rigidly affixed, as by a threaded portion 15, to each end of the secondary turns 12.

A heating tip, indicated generally as 20, has prongs 21 which are mounted in the sockets 14 and held tightly in electrical communication with the secondary turns 12 by any suitable means, such as screws 22. The gun 10 is connected to a source of power through connector 23a. When switch 23 is depressed, an electrical circuit is completed through heating tip 20.

Although heating tip 20 may be made of any suitable electrical conducting material, I prefer to use copper and to make the prongs 21 of smaller cross-sectional area than the turns 12. The prongs 21 merge into a pot 25 which may be of any suitable shape and has a bottom 26 and an encompassing sidewall 27. The end 30 of heating tip 20 remote from the prongs 21 may be of any shape suitable for heating an article to be soldered and for spreading solder thereon. The bottom 26 and sidewall 27 of pot 25 and end 30 are of smaller cross sectional area than prongs 21 thereby creating increased electrical resistance so that the pot and end will heat quickly.

Referring to the embodiment shown in Fig. 3, a heating tip 20a has a pot 25a substantially as shown in Figs. 1 and 2; however, in this embodiment, the end 30a is modified to include a self-feeding feature comprising a port 31 suitably located in the end 30a, as clearly shown. The port 31 is in hydraulic communication with the pot 25a through a passageway 32. In Fig. 5, a port 31c and a passageway 32c are placed below end 30c for purposes to be hereinafter explained.

The devices shown in Figs. 4 and 5 have prongs 21b and 21c respectively, vertically aligned and are adapted for use with soldering guns having the ends of the secondary turns vertically aligned similar to the gun shown and described in Patent No. 2,680,187.

In use, and assuming a source of alternating current in the conductor 23a, pot 25 is filled with solder and switch 23 is pressed in to complete the circuit to the gun 10. This induces a voltage in the secondary turns 12 in known manner. Being of large diameter, turns 12 offer little resistance to the flow of current therethrough and consequently little heat is developed; however, as the current flows into the prongs 21 of heating tip 20, the resistance increases. Resistance undergoes a further increase in the forward portion of tip 20 so that an operative condition of pot 25 and tip 30 is attained almost instantaneously thereby melting the solder contained in pot 25. Articles to be soldered are then dipped therein.

It will be appreciated that flux-containing solder may be used in the pot 25 in which case the flux will float and articles to be soldered will be pickled as they are immersed in the molten solder.

End 30 is used for dressing soldered connections, or it may be used for soldering in conventional manner.

The embodiment shown in Fig. 3 may be used as described in connection with the embodiment of Fig. 1 or end 30a may be used to bring articles to be soldered up to a soldering temperature whereupon the solder in pot 25a will melt and flow from pot 25a through passageway 32 and out port 31. This embodiment is especially useful for soldering small articles which do not require much heat. For work requiring more heat, I have found that solder will issue from port 31 before the article to be soldered can be brought up to soldering temperature. In such cases, the modified device shown in Fig. 5 may be used by bringing the article to be soldered up to soldering temperature with end 30c and then tipping gun 10 upwardly so that molten solder will flow through passageway 32c and out port 31c.

It will be seen that the invention provides an improved heating tip for a quick-heating electrical soldering gun.

Many modifications and variations of the invention, as set forth herein, may be made without departing from the spirit and scope of the invention. For example, a secondary circuit permanently affixed to a workbench could be substituted for the soldering gun 10 and a cover could be placed over the pot 25.

Accordingly, the drawing and specification herein are to be considered for purposes of illustration rather than of limitation.

I claim:

1. In a quick-heating soldering gun including a step-down transformer having primary turns and secondary turns, said secondary turns being of pronouncedly greater cross-sectional area than said primary turns, the combination comprising a heating tip including prongs rigidly affixed to said secondary turns, and a pot rigidly affixed to said prongs, said pot having a work-engaging end portion rigidly affixed thereto, said pot including a passageway and a port establishing hydraulic communication between said pot and said work-engaging end portion.

2. A soldering apparatus comprising a step-down transformer including primary turns and secondary turns, said secondary turns including an elongated reversely-bent element, said element having an open end portion, a pot portion and a closed end portion, said open end portion including two spaced elongated legs, said closed end portion including a tinnable soldering tip, and said pot having a bottom and an encompassing sidewall intermediate said elongated legs and said closed end portion, said elongated reversely-bent element being of pronouncedly smaller cross-sectional area than said secondary turns.

3. The device of claim 2 including also a passageway for establishing hydraulic communication between said pot and said closed end portion.

4. An electrical soldering apparatus comprising a step-down transformer having primary turns and secondary turns, said secondary turns being of greater cross-sectional area than said primary turns, and a detachable heating tip rigidly mounted and tightly held in electrical communication with said secondary turns, said heating tip being of pronouncedly smaller cross-sectional area than said secondary turns and having a work-engaging end portion, characterized in that said heating tip includes a solder-melting pot intermediate its ends.

5. The device of claim 4 being further characterized in that said work-engaging end portion includes a passageway, said passageway being in hydraulic communication with said pot.

6. An electrical heating device comprising a quick-heating soldering gun including a step-down transformer having primary turns and secondary turns, said secondary turns being of pronouncedly greater cross-sectional area than said primary turns, detachable prongs rigidly mounted and held tightly in electrical communication with said secondary turns, a solder-melting pot rigidly affixed to said prongs remote from said secondary turns, said pot having a bottom and an encompassing sidewall, a work-engaging end portion rigidly affixed to said pot, and a passageway extending longitudinally through said work-engaging end portion into said pot.

7. The device of claim 6 being characterized in that said passageway extends through said sidewall subjacent said work-engaging end portion.

References Cited in the file of this patent

UNITED STATES PATENTS

| | | |
|---|---|---|
| 448,872 | Coffin | Dec. 27, 1892 |
| 1,398,866 | Lauth | Nov. 29, 1921 |
| 1,398,867 | Lauth | Nov. 29, 1921 |
| 1,491,389 | Frykman | Apr. 22, 1924 |
| 1,847,951 | Klock | Mar. 1, 1932 |
| 2,593,947 | Weller | April 22, 1952 |
| 2,680,187 | Anton | June 1, 1954 |
| 2,737,570 | Aita | Mar. 6, 1956 |

FOREIGN PATENTS

| | | |
|---|---|---|
| 387,772 | Germany | Jan. 8, 1924 |